UNITED STATES PATENT OFFICE.

GEORGE W. CARLETON, OF BRUNSWICK, MAINE.

IMPROVED COMPOSITION FOR SETTLING COFFEE.

Specification forming part of Letters Patent No. 56,704, dated July 31, 1866.

*To all whom it may concern:*

Be it known that I, GEORGE W. CARLETON, of Brunswick, in the county of Cumberland and State of Maine, have invented a new Compound for Settling Coffee, which I term "Albuminated Sugar;" and I do hereby declare that the following is a full, clear, and exact description thereof, which will enable others skilled in the art to fully understand and make use of the same.

My invention consists in a compound of sugar, albumen, and chloride of sodium, which compound is intended for clarifying coffee, and which accomplishes it in a superior manner.

I find the following proportions answer the purpose well: sugar, (coarse grained,) fifty pounds; albumen, say, the whites of one hundred and fifty eggs; chloride of sodium, (common salt) three and one-half pounds.

The process I have adopted for making my albuminated sugar is as follows: Take fifty pounds of granulated sugar and put it into a shallow copper kettle known to confectioners as a "shaking-kettle;" hang this over a fire and keep the sugar in constant motion by whirling it around in the kettle, shaking it up and down and stirring with the hand. When the sugar has been well warmed throw into it sufficient albumen to dampen it; then equalize the dampness by stirring the mass or agitating it in any proper manner. The whole soon dries. Then add more of the albumen, and repeat the agitation until the whites of, say, one hundred and fifty eggs have been mixed and dried with the sugar. The chloride of sodium, (common salt,) three and one-half pounds, is to be added after the sugar is dried at the last drying process, and thoroughly mixed in.

I use the salt because I find it adds to the richness of the flavor of the coffee and because the unison or chemical affinity of the salt has a tendency to separate the minute floating particles of the coffee and cause them to unite with the albumen and arise in a scum upon the top, or to precipitate them with the more solid particles. To the better facilitate this action upon the liquid my compound (albuminated sugar) may be dissolved in cold water, and, after the coffee has boiled sufficiently, thrown into it. It would be well, then, to first draw off two or three cupsful and throw them back into the pot, then let the coffee-pot stand a few minutes for the coffee to settle, when it will be found that the coffee will be not only clear, but will possess a richer flavor than were my compound not used.

I intend furnishing the albuminated sugar to the market in paper packages similar to other powdered or ground preparations. The compound will keep unimpaired in any climate for an indefinite length of time.

I do not confine myself to the quantities as herein specified, for it is obvious that they can be varied to suit the demands of consumers of different tastes, and it is not absolutely necessary that the chloride of sodium be used, though I prefer to use it.

What I claim as new, and desire to secure by Letters Patent, is—

A compound for clarifying coffee, made substantially as herein specified.

GEORGE W. CARLETON.

Witnesses:
 A. P. WENTWORTH,
 CYRUS E. PARKER.